United States Patent [19]

Line

[11] Patent Number: 5,073,069
[45] Date of Patent: Dec. 17, 1991

[54] MACHINE FOR MILLING THE ENDS OF INGOTS OR SLABS

[75] Inventor: Henri Line, Peymeinade, France
[73] Assignee: Helis, Peymeinade, France
[21] Appl. No.: 636,495
[22] Filed: Dec. 31, 1990
[51] Int. Cl.⁵ ............................................. B23C 3/24
[52] U.S. Cl. ................................... 409/197; 409/205
[58] Field of Search ............... 409/138, 174, 183, 172, 409/202, 205, 197, 218, 189; 269/290, 292, 293

[56] References Cited

U.S. PATENT DOCUMENTS

| | | | |
|---|---|---|---|
| 1,844,057 | 2/1932 | Buchan et al. | 144/198 |
| 2,231,964 | 2/1941 | Strawn et al. | 409/197 X |
| 2,969,001 | 1/1961 | Swanson et al. | 269/303 X |
| 3,163,085 | 12/1964 | Wishing | 409/205 |
| 3,668,971 | 6/1972 | Dever | 409/197 X |
| 4,002,102 | 1/1977 | Brown | 409/218 |
| 4,684,300 | 8/1987 | Break | 409/134 |

FOREIGN PATENT DOCUMENTS

| | | | |
|---|---|---|---|
| 216664 | 12/1984 | Fed. Rep. of Germany | 409/172 |
| 150907 | 11/1980 | Japan | 409/197 |
| 20813 | 2/1985 | Japan | 409/197 |

Primary Examiner—William Briggs
Attorney, Agent, or Firm—Sheridan Ross & McIntosh

[57] ABSTRACT

The present invention relates to a machine for milling the ends of ingots or slabs, which comprises a fixed standard, a broach head mounted to slide on two vertical guiding slideways with which said standard is provided and bearing a horizontal-axis cylindrical mill. The fixed standard, oversized, presents a transverse conduit opening out between the two slideways in front of the mill. The piece to be machined is disposed in this conduit and fixed by fixation means placed as close as possible to the slideways.

10 Claims, 2 Drawing Sheets

MACHINE FOR MILLING THE ENDS OF INGOTS OR SLABS

FIELD OF THE INVENTION

The present invention relates to a machine for milling the ends of oblong pieces, particularly ingots or slabs, of the type comprising:
- a fixed standard,
- a broach head mounted to slide on two parallel guiding slideways with which said standard is provided, and able to be equipped with a cylindrical mill, and
- means for driving the mill and the broach head.

BACKGROUND OF THE INVENTION

A milling machine of this type is known, in which the broach presents a vertical axis and moves horizontally. The cylindrical mill is disposed on the side of the broach head remote from the horizontal guiding slideways with which the fixed standard is provided. This latter is fixed on a concrete mass of large dimensions of which a part, which extends below and in front of the broach head, serves as support for the pieces to be machined, the latter being held by fixation means fast with the concrete frame.

Although these milling machines are very heavy, they lack rigidity, as they present considerable overhangs between, on the one hand, the foot of the fixed standard and the piece to be machined and, on the other hand, between the foot of the fixed standard and the mill. Deformations occur due to the torsion and bending, during machining of the workpiece, further to these considerable overhangs. This brings about variations in the distance existing between the piece to be machined and the mill.

A machine incorporating a horizontal broach and a mobile standard is also known, employing a mill with a surface of large diameter. The piece to be machined is also fixed on the concrete mass during machining, which brings about considerable overhangs.

The same applies for a third type of machine incorporating a vertical broach and mobile standard which employs a so-called rolling cylindrical mill.

It is an object of the present invention to propose a machine of the type mentioned, which considerably reduces the variations in distance between the piece to be machined and the mill, and which makes it possible to obtain a continuous cut without vibrations, which leads to an increased life of the tools.

SUMMARY OF THE INVENTION

The object is attained according to the invention in that the fixed standard comprises a transverse conduit opening out on that face of said standard adjacent the broach head through an opening disposed between the two guiding slideways, said conduit being dimensioned to house part of the piece to be machined, the end to be milled emerging through said opening; in that the mill is disposed in front of said opening and perpendicularly to said slideways; and in that said standard is equipped with means for fixing the workpiece, placed as close as possible to the slideways.

Thanks to this design of the milling machine, the overhangs are limited, if not eliminated. The forces undergone by the workpiece being machined are transmitted by the fixation means to the adjacent regions, i.e. the slideways. Similarly, the reactions of the mill are supported by the slideways. The distance between the piece to be machined and the mill is thus constant during the period of machining, as there are no longer any vibrations provoked by the deformations of bending and of torsion of the machines for milling the ingots of the prior art.

The mill is advantageously disposed between a broach and a counter-broach guided in very oversized bearings, which are placed as close as possible to the slideways for guiding the broach head.

The two guiding slideways are advantageously disposed vertically on the fixed standard which is dimensioned largely.

Thanks to this arrangement, the broach presents a horizontal axis, which allows total recovery of the chips by gravity.

The mill is advantageously fixed very rigidly to the broach and to the counter-broach by large-diameter plates.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
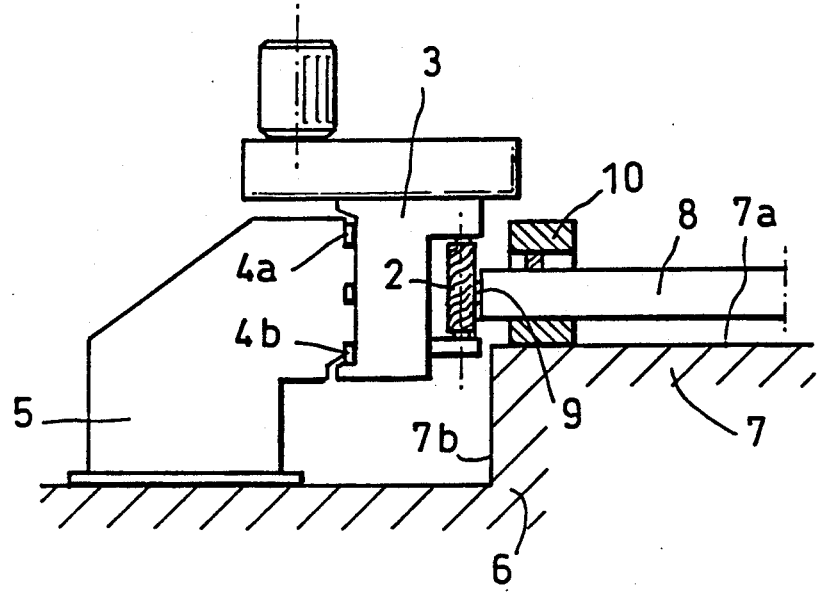
FIG. 1 shows a side view of a known machine for milling ends of ingots or slabs.
Figure 2:
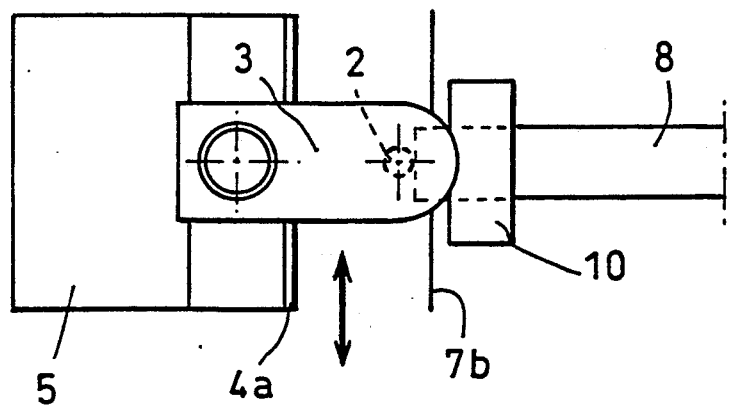
FIG. 2 is a plan view of the same known machine.

Referring now to the drawings, FIGS. 1 and 2 show a known milling machine representing the state of the art closest to the present invention.

This machine comprises a cylindrical mill 2 of vertical axis borne by a broach head 3 mounted to slide on two parallel, horizontal guiding slideways 4a and 4b provided on a fixed standard 5. The latter is supported by a concrete mass 6 of large dimensions of which a part 7 extends longitudinally in front of the broach head 3 and presents a flat upper face 7a below the mill 2. The piece 8 to be machined, which may in particular be an ingot or a slab, is placed transversely above this part 7 so that its end 9 to be machined is located in overhang near an edge 7b of the part 7 in the space in which the mill 2 moves during operation of the machine. The piece 8 to be machined is solidly maintained on this part 7 by a clamping means 10.

During operation of the machine, the forces due to the action of the mill 2 on the workpiece 8 are transmitted through the concrete mass 6, the fixed standard 5 and the broach head 3. Although all these parts of the machine are very heavy and massive, the overhangs are considerable and bending or torsion deformations occur which are detrimental to the quality of the machining and reduce the life duration of the tools due to the variation of the distance between the workpiece and the mill.

Figure 5:
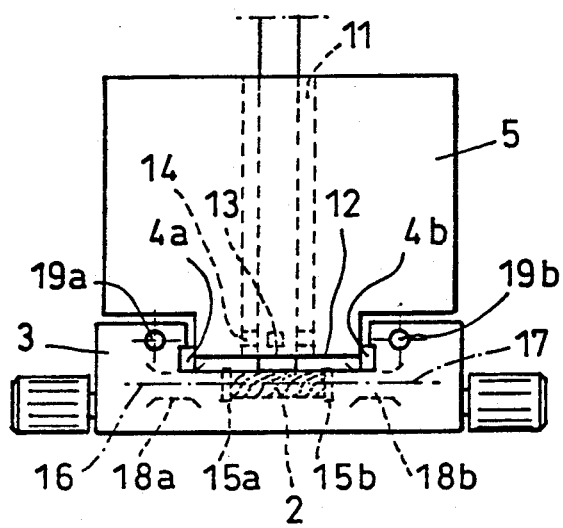
FIG. 5 is a plan view of the same machine.
Figure 3:
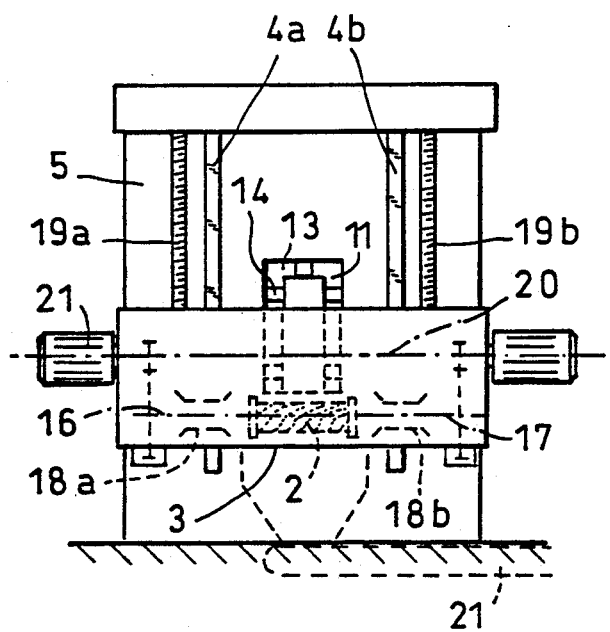
FIG. 3 is a front view of a milling machine according to the present invention.
Figure 4:
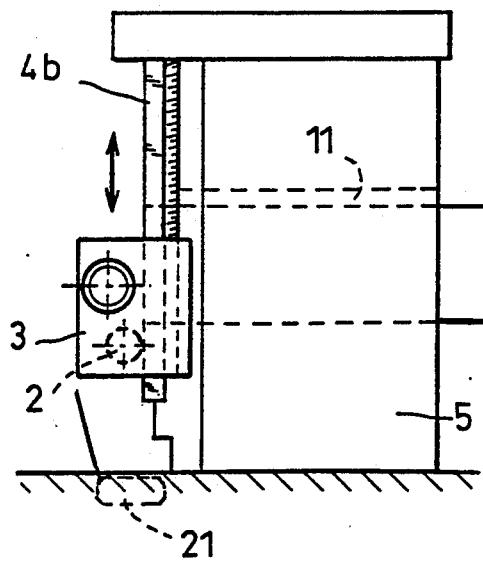
FIG. 4 is a side view of the machine of FIG. 3.

FIGS. 3 and 5 show an embodiment of a milling machine according to the invention in which the overhangs are reduced to a minimum.

This milling machine comprises a cylindrical mill 2 of horizontal axis borne by a broach head 3 mounted to slide on two parallel, vertical guiding slideways 4a and 4b provided on a fixed standard 5. According to an essential feature of the machine, the fixed standard 5 is oversized and it presents a transverse conduit 11 which opens out, on face 12 of the fixed standard 5 which is adjacent the broach head 3, through an opening 13 located between the two vertical guiding slideways 4a and 4b. The transverse conduit 11 is dimensioned so that part of the piece 8 to be machined may be housed therein, the end 9 to be milled projecting on the front of the face 12 of the fixed standard 5. The means 14 for fixing the workpiece 8 are integrated with the fixed standard 5 and they are placed in the vicinity of the guiding slideways 4a and 4b.

The mill 2 of horizontal axis is disposed opposite the opening 13 and it is fixed very rigidly by large-diameter plates 15a and 15b on a broach 16 and a counter-broach 17. The latter are guided by very oversized bearings 18a and 18b which are placed as close as possible to the guiding slideways 4a and 4b of the broach head 3 and borne by the broach head 3.

This novel design of the milling machine makes it possible considerably to reduce the overhangs and consequently to reduce the bending and torsion deformations. A uniform thickness of cut is thus obtained upon each passage of the mill 2.

According to another feature of the invention, the milling machine enables a continuous cut to be obtained without vibrations in that the section of the chips per tooth is constant.

To that end, the broach head 3 is entrained in its vertical displacement by two ballscrews 19a and 19b with pre-stressed nuts of large section and synchronized, this ensuring a constant advance of the mill 2 parallel to itself.

Moreover, the broach 16 and the counter-broach 17 are synchronized in rotation and driven by a kinematic chain 20 with compensation of clearance. This kinematic chain 20 is itself driven at constant speed by at least one electric motor 21.

The horizontal arrangement of the mill 2 and the vertical displacement thereof allow total recovery of the chips by gravity. The chips may be evacuated by a conveyor 21 disposed beneath the mill 2.

Monitoring of the speed of rotation of the mill 2, of the vertical displacement of the broach head 3 and of the auxiliary functions of the machine, such as supply and release of the workpieces for example, may be ensured by a numerical control (not shown in the drawings). This numerical control may also ensure assembly and dismantling of the mill, such manoeuvres being facilitated and effected more quickly by using gear face plates.

What is claimed is:

1. In a machine for milling the ends of oblong workpieces, particularly ingots or slabs, of the type comprising:
    a fixed standard,
    a broach head mounted to slide on two parallel guiding slideways with which said fixed standard is provided, and able to be equipped with a cylindrical mill, and
    means for driving the mill and the broach head,
    the fixed standard comprises a transverse conduit opening out on that face of said standard adjacent the broach head through an opening disposed between the two guiding slideways, said conduit being dimensioned to house part of the piece to be machined, the end to be milled emerging through said opening; the mill is disposed in front of said opening and perpendicularly to said slideways; and said standard is equipped with means for fixing the workpiece, placed as close as possible to the slideways.

2. The machine of claim 1, wherein the mill is disposed between a broach and a counter-broach guided in oversized bearings which are placed as close as possible to the slideways for guiding the broach head.

3. The machine of claim 2, wherein the mill is fixed very rigidly by large-diameter plates on the broach and the counter-broach.

4. The machine of claim 1, wherein the two guiding slideways are disposed vertically on the fixed standard.

5. The machine of claim 1, wherein the fixed standard is oversized.

6. The machine of claim 2, wherein the two guiding slideways are disposed vertically on the fixed standard.

7. The machine of claim 3, wherein the two guiding slideways are disposed vertically on the fixed standard.

8. The machine of claim 4, wherein the fixed standard is oversized.

9. The machine of claim 2, wherein the fixed standard is oversized.

10. The machine of claim 3, wherein the fixed standard is oversized.

* * * * *